United States Patent [19]

Taddei-Contreras et al.

[11] Patent Number: 4,675,042

[45] Date of Patent: Jun. 23, 1987

[54] AUTOMATIC GLASS CONTAINER REJECTOR

[75] Inventors: Fernando Taddei-Contreras; Santiago Rodriguez-Tovar; Luis Cardenas-Franco, all of Monterrey, Mexico

[73] Assignee: Vitro Tec Fideicomiso, Monterrey, Mexico

[21] Appl. No.: 872,972

[22] Filed: Jun. 11, 1986

[30] Foreign Application Priority Data

Jun. 17, 1985 [MX] Mexico ................................. 205669

[51] Int. Cl.[4] ............................................... C03B 9/40
[52] U.S. Cl. ........................................ 65/158; 65/165; 65/169; 65/DIG. 13
[58] Field of Search ................. 65/158, 160, 165, 169, 65/DIG. 13

[56] References Cited

U.S. PATENT DOCUMENTS

| | | | |
|---|---|---|---|
| 4,004,904 | 1/1977 | Fergusson | 65/158 |
| 4,108,623 | 8/1978 | Cárdenas-Franco | 65/158 X |
| 4,332,606 | 6/1982 | Gardner | 65/158 |
| 4,338,115 | 7/1982 | Farkas | 65/158 X |
| 4,369,052 | 1/1983 | Hotmer | 65/158 X |
| 4,431,436 | 2/1984 | Lulejian | 65/165 X |
| 4,494,656 | 1/1985 | Shay et al. | 65/158 X |
| 4,614,531 | 9/1986 | Bishop et al. | 65/158 |

Primary Examiner—Arthur Kellogg
Attorney, Agent, or Firm—Abelman Frayne Rezac & Schwab

[57] ABSTRACT

A system for a multiple condition sensing and ware rejection for a computer controlled glass ware forming apparatus including mold temperature detectors, smoke detectors mounted to monitor each mold and gob cutting detectors mounted to control the overall speed of the apparatus and wherein control means are provided to respond to the temperature detector to lubricate the particular hot mold and other control means mounted to respond to a smoke signal to program the ware rejection means to reject the particular glass ware formed in the smoke containing molds.

4 Claims, 5 Drawing Figures

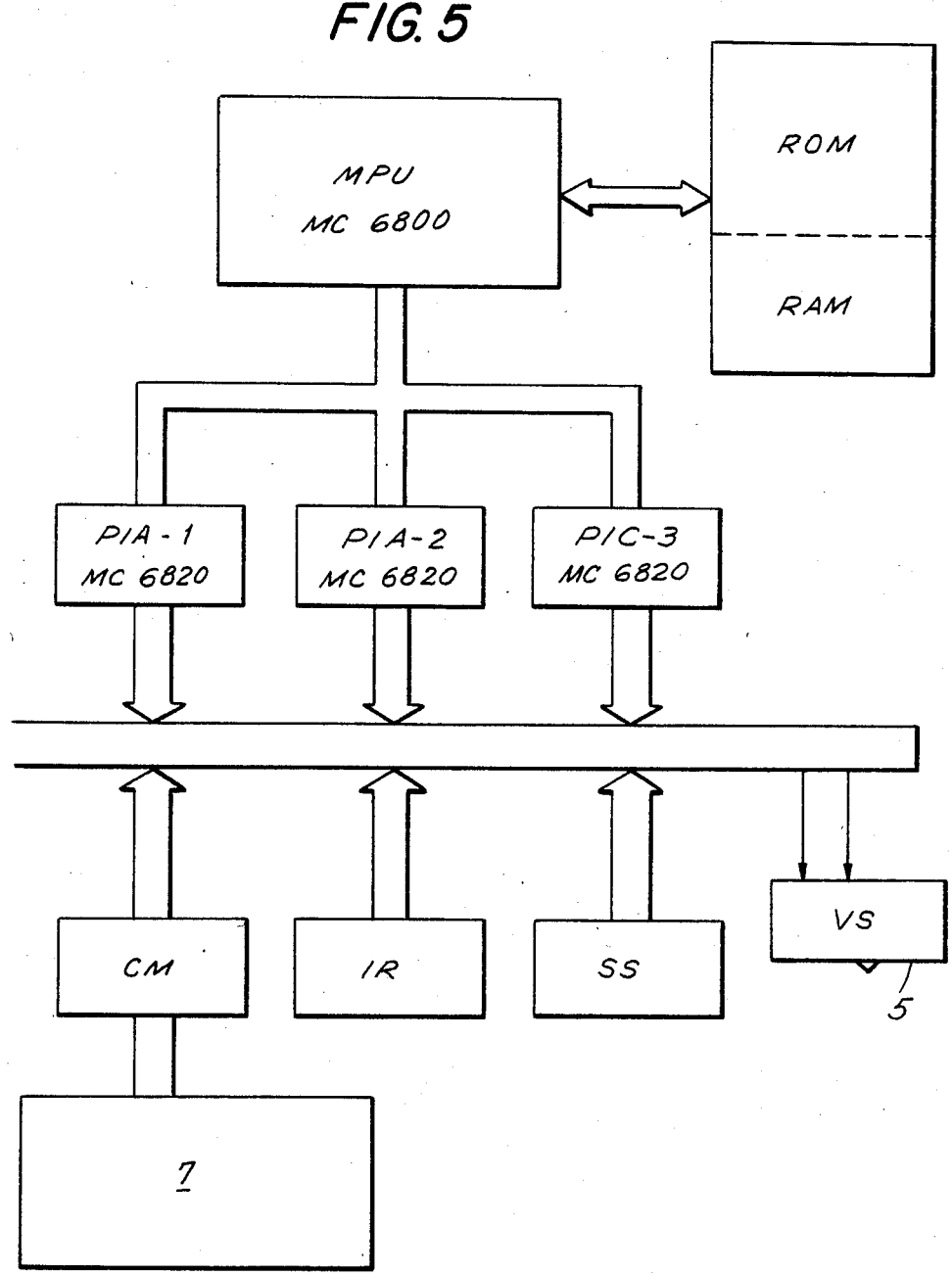

AUTOMATIC GLASS CONTAINER REJECTOR

BACKGROUND OF THE INVENTION

In the manufacture of glass articles and particularly in the manufacture of glass containers or glass bottles using the blow-blow process or the press-blow process in an I. S. machine, generally one with double or triple cavity or sections, it is common for the containers, at certain time intervals, to stick to the molds. This happens with parison molds or with blow molds.

The sticking of the containers to the molds, is due principally to the fact that the mold temperature goes above a determined temperature limit. This increase in the temperature of the molds, generally takes place when the molds become dry for lack of lubricant.

This problem is easily solved by cleaning the glass of the containers that stuck to the molds and lubricating the mold cavities. However, said lubrication has as a consequence that the first containers formed in the recently lubricated molds come out thinner with a thicker bottom and with a superficial coating of lubricant which is hard to remove. This is why they have to be removed from the production line before they are given a thermic treatment (annealing or tempering) and packaging.

The rejection of the containers spotted with lubricant, which travel on the machine's conveyor, is usually carried out in a semi-automatic manner through the "rejector" which is made up of a hydraulic or pneumatic device which moves a piston or rod which knocks out the containers when the operator makes it work in syncronism with the speed of the conveyor so that the rejected containers can be eliminated from the same.

However, the said semi-automatic devices have a problem in that they are not able to identify the containers formed in a cycle or in a given section, nor are they able to determine the number of articles that must be scrapped. For this reason they do reject an indiscriminate amount of them with the corresponding losses and production reduction.

The apparatus claimed by Gardner's U.S. Pat. No. 4,332,606 tries to solve the previous problem through the introduction of a manual circuit breaker for each mold of each section of the machine and a pulse generator which corresponds to the articles manufactured by the machine. Thus, when the operator lubricates certain molds and actuates the corresponding circuit breakers, the apparatus is enabled, by the pulse generator to identify the articles of said molds, which are transported on the conveyor to reject those articles exclusively. Said apparatus can also include a photo sensor located next to the rejecting device and so correct the slight delays in the position of the articles selected.

In the U.S. Pat. No. 4,152,134 is claimed an electronic control system that actuates a rejection device similar to the previous one, activated by the operator through a control panel with which the molds and the section which needs to reject the articles can be selected.

Nevertheless, even when the apparatus of the previous art are already able to identify articles that need to be rejected, the loss problems and the consequent production reduction have not yet been solved since they are not able to identify when it is necessary to lubricate the molds. Consequently the articles stick to the molds and a number of articles are thus wasted.

Besides, after cleaning and lubricating the molds, since the said apparatus do not include a programmer to set the number of containers that must be rejected because they are spotted with lubricant, generally the articles keep being rejected indiscriminately until the operator becomes aware that good articles are being rejected thus increasing the losses and reducing production.

Because of the above, the inventors of the present invention, taking into account all of the problems presented by the previous art, invented an automatic article rejector which is able to identify and send a prompt notice when it is necessary to lubricate the molds of a given section, and this is done before the articles stick to the molds. The rejector is capable of identifying and rejecting precisely the articles that correspond to the lubricated molds and the section within the same, thus rejecting only a predetermined number of articles, and it automatically suspends the rejection signal of the rejection device, thus lessening the number of lost articles and permitting a production increment.

SUMMARY OF THE INVENTION

Therefore an objective of the present invention is to provide an automatic glass container rejector which is capable of identifying and advising promptly when it is necessary to lubricate the molds of a given section of the machine. This is done before the articles start to stick to the molds and thus prevents production delays due to the need of eliminating articles that stick to the molds with the consequent unnecessary loss of the articles of the section involved.

Another objective of this invention is to provide an automatic glass container rejector, of the above mentioned nature, which is able to automatically control the rejection device so that it can identify and reject precisely the predetermined number of articles that correspond to the lubricated molds in the corresponding section of the machine.

These and other objects and advantages of the present invention will be obvious to experts in the field with the following detailed description of the invention which is made in relation to the attached drawings.

BRIEF DESCRIPTION OF THE DRAWINGS

The invention will now be described making reference to a modality of the same, illustrated in the attached drawings, where the numbers themselves indicate the same parts of the figures shown, wherein:

FIG. 5 is a block diagram of the intercommunication system (hardware configuration) of the automatic glass container rejector of the present invention.

DETAILED DESCRIPTION OF THE INVENTION

The conventional technology used for manufacturing glass articles, especially containers, in the so-called I. S. machines, generally includes a continuous feeding current of molten glass, starting from a feeder, through which a shear mechanism cuts the glass into gobs from which the containers are formed. These cut gobs are continuously directed through the use of a gob distributor or through of gob feeder chutes towards the molds of the diverse sections of the machine which is made up of 8 sections, each one of which generally includes 2 to 4 cavities, wherein are first formed, through blowing a parison or preform, in an inverted position, which later is deposited in the final molds, which also through blowing, the final form of the containers is provided.

Once the containers have been formed, a take out takes them out of the molds to deposit them on cooling plates. From these plates a 90° pusher takes them off to deposit them on a conveyor which takes them through a transfer mechanism towards a cross conveyor to be pushed in rows through cooling plates and then to an annealing lehr.

The operation of the I. S. Machine is achieved through the use of conventional controls such as the well-known mechanical timing drum or any one of the electronic controls known today.

Figure 1:
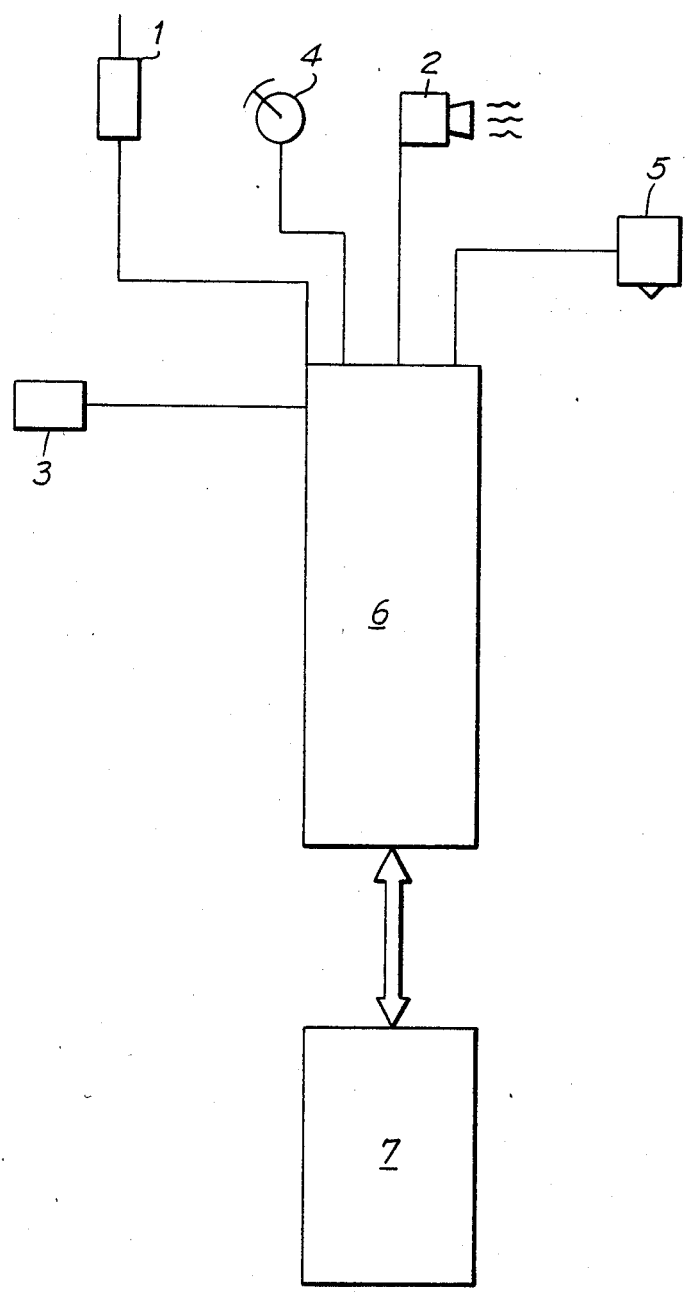
FIG. 1 is a block diagram for automatic glass container rejector in agreement with the present invention.
Figure 2:
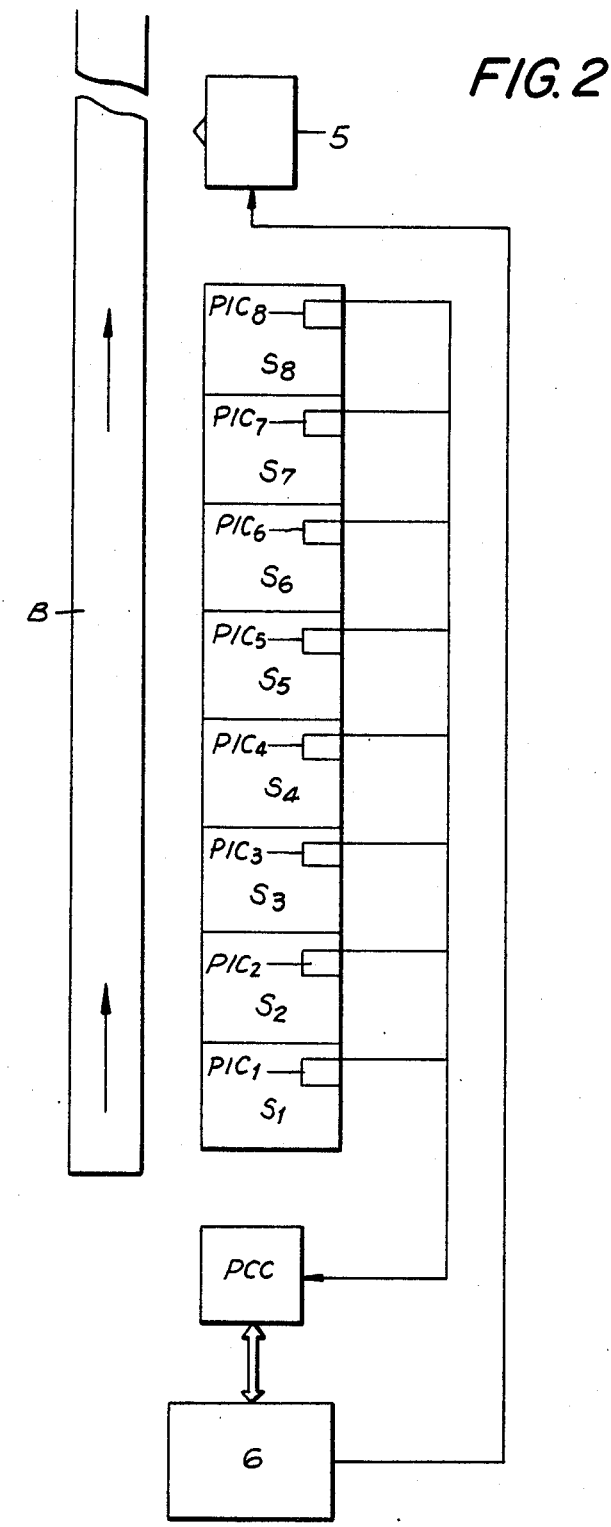
FIG. 2 is a block diagram of the layout of a forming machine of multiple sections, including the automatic glass container of the present invention.
Figure 3:
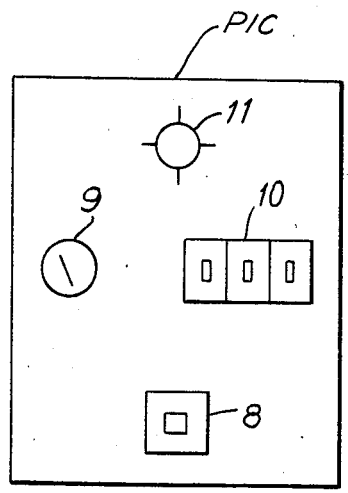
FIG. 3 is a representative diagram of the individual panel of the present invention which shows its control and indication components.
Figure 4:
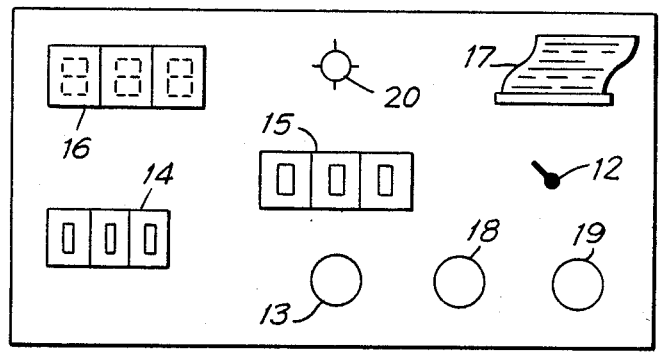
FIG. 4 is a representative diagram of the central control of the rejector, demonstrating also its indicated components, data and control reception.

Now making reference to the drawing, specifically to figures 1 and 2, the automatic glass container rejector of the present invention, specifically for the I. S. machine (FIG. 2) described above, which includes 8 sections, from $S_1$ to $S_2$, and a double cavity (not shown) comprising:

A temperature detector at each one of the molds (not shown) of each section, $S_1$ to $S_8$ of the I. S. machine, schematically represented in the block diagram of FIG. 1 with No. 1. This temperature detector can be a thermopar or preferably a temperature transductor such as an infra-red pyrometer, located at the top of each one of the molds (not shown) y focused towards its interior. This infra-red pyrometer is actuated by a "open mold" signal which comes from the electronic control of the machine or from a proximity of pressure detector if the machine includes a mechanical timing drum (not shown) used to provide a representative signal of the internal temperature of the molds. With this information the time when the respective molds of the machine need to be lubricated can be determined;

a smoke detector at each one of the molds of each section, $S_1$ to $S_8$ of the I.S. machine. This is schematically represented in the block diagram of FIG. 1 with Number 2, located at the top of the molds. This detector provides a signal that indicates the presence of lubricants in the molds, which automatically causes the rejection signal;

a gob cutting detector schematically represented with number 3. This detector can be electromechanic or ferromagnetic and is in communication with the gob shear mechanism (no shown). It provides a representative signal of the gob cutting speed in order to determine the speed of the conveyor B, (FIG. 2) of the I.S. machines, upon which the finished articles are deposited;

a synchronous detector schematically represented by number 4, whose sychronic signal can be taken from the transmission emited by the feeder, from the axle of the gob distributor, from the mechanical timing drum or from the electronic control (not shown) of the I.S. machine, which provides a signal that is representative of the forming cycle, in order to determine to which section belong the articles which must be rejected in a given molds, and their separation by placing them on the conveyor B of the I.S. machine;

a pneumatic rejecting unit schematically represented with number 5, which includes an actuator and a cylinder and piston set (not shown) whose reciprocal piston is actuated by solenoids and includes a rod to knock down the articles that are going to be rejected from the conveyor B. This pneumatic rejection unit 5 is located next to the conveyor B, at a determined distance from tha last section, $S_8$, of the I.S. machine;

a data processing unit 6, such as a microcomputer which includes ROM memory (Read Only Memory) and RAM memory (Random Acces Memory), illustrated in FIG. 5, which receives and processes the temperature signals of the molds, the presence of smoke and the synchrony of the operation data in order to provide a notice signal of when and what molds of what section must be lubricated and which articles must be rejected by the rejecting devide 5;

a control panel 7, (FIG. 1) comprising a plurality of individual control panels and data receiving $PIC_1$ to $PIC_8$, (FIGS. 2 and 3), one for each section $S_1$ to $S_8$ of the I.S. machine, each one of which includes a starting switch 8, to start operating the same; a selector switch 9, to select the automatic operation or permanent rejection, for the corresponding section; a thumbwheel type switch 10, to establish the number of articles which need to be rejected from that section, when the molds of the same are lubricated; and a lubrication indicator II, such as a luminous signal and, if wished, one with sound, in order to indicate to the operator when it is necessary to lubricate the molds of that section; and a central control panel PCC (FIGS. 2 and 4), which includes a switch 12, which starts the operation of the rejection system; a readjustment switch 13, in order to be able to introduce the data of the operation; a thumbwheel type space selector 14, used to establish the separation among the containers and the position of the same on the conveyor B, that correspond to all sections, of the machine; a time lubrication switch 15, of the thumbwheel type, to establish the time that the mold lubrication should last in the diverse sections of the machine; a pneumatic indicator 16, where the total number of containers that have been rejected by the rejection unit 5, is recorded; a data printer 17, to record the feeding data history and the number of rejected containers in a determined period of time; a data reception switch 18, to receive the data fed to the data processing unit 6; and a switch-selector of operation means 19, to select the operation forms of general rejection, programmed rejection and permanent rejection; and a rejection unit 20, such as a luminous signal to indicate when the rejection unit 5, is in operation.

Making reference to FIG. 5, the signal converters, which permit the intercommunication between the diverse elements of the automatic glass container rejector of the present invention, are made up in the following manner: the data processing unit 6 such as a Motorola microcomputer MC6800, the ROM and RAM memories are intercommunicated with 3 interphase adaptors, PIA-1, PIA-2 and PIA-3, preferable a Motorola NC6829, which themselves are in charge of communicating with the control panel PC through the multiplexor circuits MC with the remote switch IR and the sensor signals SS, with their exit towards the solenoid valves VS, of the rejection unit 5.

In order to facilitate the operation the automatic glass container rejector of the present invention does not require any adjustment or alteration when a change of article or of speed of the machine is made.

Basically this rejector can operate in 4 different ways which are enumerated as follows:

MODE A

Programmed Rejection

With this type of operation, the system will reject in predetermined quantities by the operator in any section or in all, independently, and this type of rejection is established at the individual control panels $PIC_1$ to $PIC_8$ and the central control PCC, and procedure is as follows:

1. The number of articles that need to be rejected is established at the thumbwheel type switch 10.
2. It is establiched by means of starting switch 8 the section that requires the rejection of articles.
3. The spacing selector 14, is actuated in order to set the spacing and the position of the articles on the conveyor; "Ahead" if it is the article in front, and "behind" if it is the article behind and in the central position if it is the one in front and the one behind.
4. Once the above information is established, switch 19 is actuated in order to initiate the Programmed Rejection.
5. In case there is need to finish the operation before the end of the process, or in other words, before the programmed articles are rejected, the following method is used:

5a. Through the use of the starting switch 8, the panel of the section of the machine from which the programmed rejection wants to be suspended is deprogrammed.

5b. The spacing selector 14, is actuated to readjust the position of the containers such as in case 3.

5c. The readjustment switch 13, is actuated which automatically suspends the programmed rejection.

MODE B

Permanent Rejection

With this manner of operation, the system will reject articles during the time that the operator considers convenient and in any section of the machine or in all independently, and it can be established from the indivual control panels $PIC_1$ to $PIC_8$ and from the central control panel PCC, and the procedure us as follows:

1. Through the use of starting switch 10, the section for article rejection can be set for an indefinite time.
2. After the above switch 14, is actuated as in step 3 of Mode A.
3. Lastly selector switch 9, is actuated in its permanent rejection position and the latter starts the desired operation.
4. In case this mode of operation is wished in various sections, steps 1, 2 and 3 are repeated for each section.
5. In order to exit from this mode of operation, steps 5a, 5b and 5c of Mode A are executed.

MODE C

Rejection by Lubrication

With this mode of operation the system will reject four articles automatically in response to the signal from the smoke detector 4, emitted by the microcomputer 6, in the corresponding section or sections. This type of operation is the only one that can be set from the central control panel PCC since, when a section is being lubricated, the smoke sensor 2, automatically programs the microcomputer so that it rejects four articles after the lubrication takes place.

MODE D

General Rejection

With this mode of operation, the system will reject all the articles of all the sections simultaneously through the intervention of switch 19, in its position of general rejection, which is located on the central control panel PCC and it is set in the following manner:

1. Switch 19, is actuated in its position of "GENERAL REJECTION" which initiates its operation in that manner.
2. In order to exit from this mode of operation, the readjustment switch 13, is actuated.

Thus, depending on the control method which is programmed through the panels of operation and the microcomputer, the glass container automatic rejector of the present invention, will detect and automatically inform the operator when it is necessary to lubricate the molds of the machine and automatically reject the articles that are spotted with lubricant. The rejection operation is ordered by the smoke sensor 2, of th corresponding section and thus initiates the programmed rejection through the control panels 7, and the microcomputer, 6.

We claim:

1. An automatic glass container rejector for glassware forming machines with multiple molds and sections which automatically detect and inform the operator when it is necessary to lubricate the machine's molds and automatically rejects the articles that are spotted with lubricant, comprising:

a temperature detector in each mold of each section of the machine which provides a signal that represents the internal temperature of the molds to determine when it is necessary to lubricate them;

a smoke detector in each mold of each section of the machine which provides a signal that represents the presence of lubricant in the molds in order to emit a rejection order for the articles that come from the molds of said section;

a gob cutting detector which provides a signal that represents the cutting speed in order to set the speed of the conveyor of the machine on which the finished articles travel;

an article rejection unit which knocks out the articles which are to be rejected, which is located on one side of the conveyor, next to the last section of the machine;

a data processing unit which is fed with the operation data and the number of articles that need to be rejected and wherein the data processing unit receives and processes the signals of the detectors so that it can provide warning signals of when and which molds of which section need to be lubricated and which articles must be rejected by the rejection unit;

control panels that are interconnected and communicated with the data processor wherein the control panels include warning indicators which warn the operator when and which molds must be lubricated; selector-switch to feed operation data and the modes of control to the data processing unit and visual indicators to provide and record the operation data with which the work is being done;

and signal converters used to adapt the intercommunication signals between the detectors, the data processing unit, the article rejection unit and the control panels.

2. The automatic glass container rejector as claimed in claim 1, wherein the article rejection unit is of the type which is operated by fluid through the use of solenoid valves, and which includes a pointed rod which is used to knock out the articles to be rejected.

3. The automatic glass container rejector as claimed in claim 1, wherein the data processing unit consists of a microcomputer which comprises a volatile memory of alleatory access for accumulating the operational data which is fed to the microcomputer and a fixed memory which comprises a program for data processing to provide the warning signals or the knocking out order to the control panels, the computer and the rejection unit, respectively.

4. The automatic glass container rejector as claimed in claim 1, wherein the control panels comprising an individual control panel for each section of the machine, which includes an starting switch, a switch for selecting the method of operation, a switch for selecting the number of articles to be rejected, and a warning signal to inform the operator which molds of which section must be lubricated and a central control panel which includes visual information presentors, an starting switch, a switch to select the number or articles that need to be automatically rejected, a selector switch for selecting the rejector's method of operation, a switch for the introduction of information readjustment or information re-feeding, and an operation rejection luminous signal.

* * * * *